United States Patent [19]

Martin et al.

[11] Patent Number: 5,331,746
[45] Date of Patent: Jul. 26, 1994

[54] PROCESS AND AN APPARATUS FOR REMOVING WATER FROM ASH

[75] Inventors: Walter J. Martin, Tegernsee; Johannes J. E. Martin, Seeshaupt, both of Fed. Rep. of Germany

[73] Assignee: Martin GmbH fur Umwelt-und Energietechnik, Munich, Fed. Rep. of Germany

[21] Appl. No.: 811,795

[22] Filed: Dec. 20, 1991

[30] Foreign Application Priority Data

Dec. 21, 1990 [DE] Fed. Rep. of Germany ..... 40413891

[51] Int. Cl.$^5$ ............................................. F26B 5/14
[52] U.S. Cl. ........................................ 34/401; 34/70; 34/164
[58] Field of Search ................ 34/14, 17, 69, 164

[56] References Cited

U.S. PATENT DOCUMENTS 3,900,958 8/1975 Bongert et al. ............ 34/167
4,843,732 7/1989 Cross .

FOREIGN PATENT DOCUMENTS 61-11919 1/1986 Japan .

*Primary Examiner*—Henry A. Bennet
*Attorney, Agent, or Firm*—McAulay Fisher Nissen Goldberg & Kiel

[57] ABSTRACT

A process and apparatus for extracting water from ash that has been quenched in water bath of an ash discharger and which is expelled from the water bath by means of a discharge ram through a discharge chute includes an improvement wherein the discharge chute of the ash discharger is caused to vibrate. The vibration is provided by a vibration generator, particularly of the unbalanced type.

6 Claims, 1 Drawing Sheet

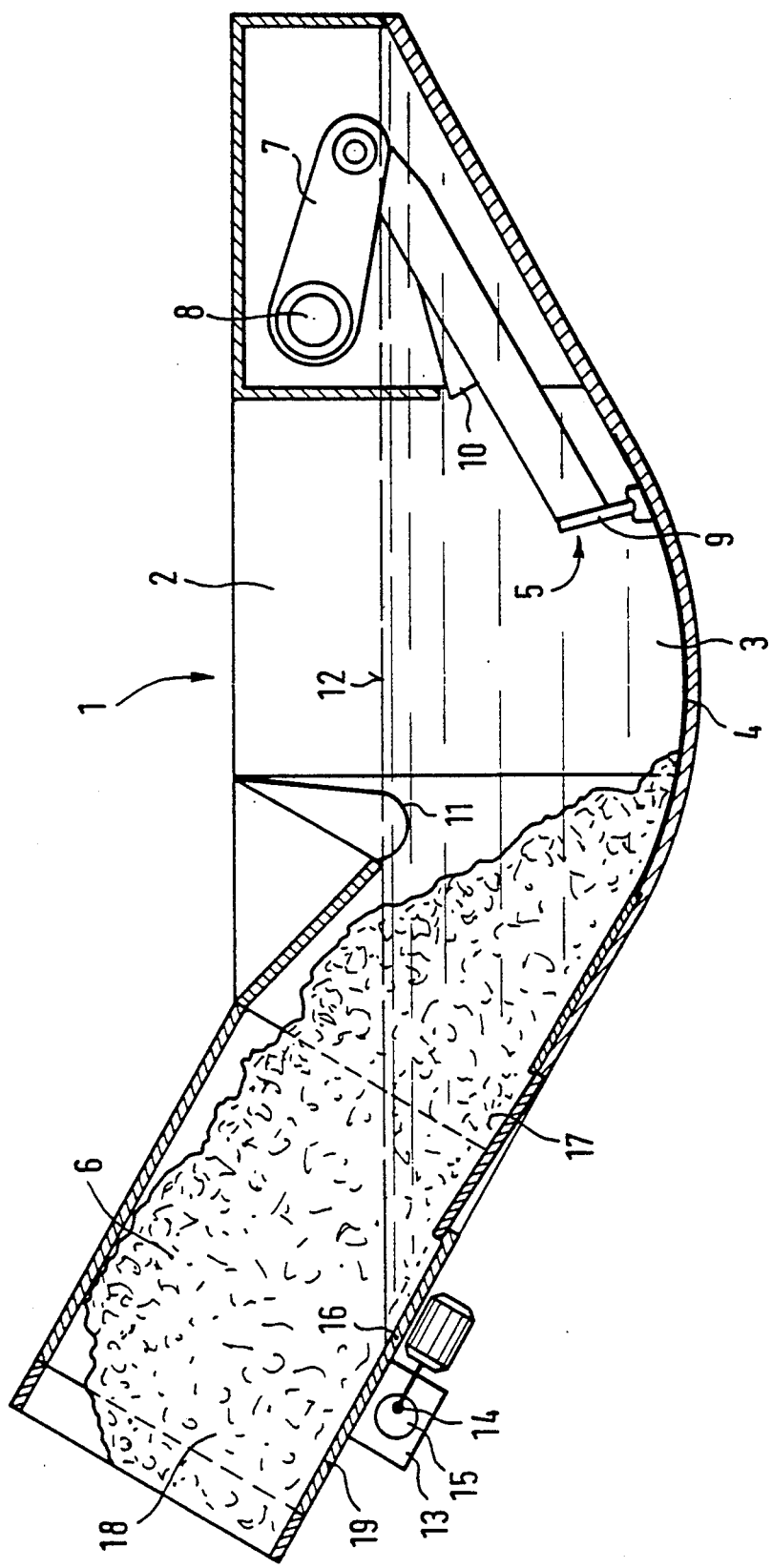

PROCESS AND AN APPARATUS FOR REMOVING WATER FROM ASH

BACKGROUND OF THE INVENTION

1. Field of the Invention

The present invention relates to a process for removing the water from ash that has been quenched in the water bath of a ash discharger, this ash being removed from the water bath through a discharge shoot by means of a discharge ram. The present invention also relates to an apparatus for carrying out the process.

2. Background Art

In furnaces, the fuel that has been burned moves through a ash shaft into a deslagger that is filled with water and which incorporates a discharge chute that is curved in an arc shape and a discharge ram that can move back and forth and which moves ash that has been quenched in the water bath from the water bath to the outside through the upwardly inclined discharge chute (see, for example, DE-OS 25 39 615).

Because the ash is quenched with water it is, of necessity, completely saturated with water which causes problems with regard to its disposal or if it is to be subjected to further processing. One of the problems lies in the fact that the water that adheres to the ash is in part released during subsequent transportation. This can lead to the undesirable escape of water from the means of transport and, because of the fact that this water contains harmful substances, it can contribute to environmental pollution or to pollution of the ground water. Another significant problem lies in the fact that because of the water that it contains, the ash is correspondingly heavier, which leads to a considerable increase in transportation and dumping costs.

OBJECT AND SUMMARY OF THE INVENTION

It is a primary task of the present invention to permit the extensive removal of water from ash that originates from a furnace and to do this in the simplest possible manner without any additional cost-intensive plant.

Proceeding from the process of the type described in the introduction hereto, according to the present invention this task has been solved in that the discharge chute of the ash discharger is caused to vibrate. Particularly good results are achieved if, in further development of the present invention, the area of the discharge chute that is free of water is caused to vibrate. Because of the generation of this vibration, which is transferred from the discharge chute to the ash that is within the chute, a large quantity of water is extracted from the ash which, after processing according to the present invention, has a water content of approximately 12%, whereas ash that leaves the ash discharger without being processed according to the present invention has a water content of approximately 18 to 22%. This means that a considerable quantity of water has been extracted, which greatly reduces the consumption of fresh water or additional process water. The ash that is obtained after this process feels like damp earth and has no more drops of water adhering to it.

In order to carry out this process, it is sufficient if, according to the present invention, a vibration generator, in particular an unbalance-type generator, is installed on the discharge chute. This leads to a particularly simple system for carrying out the process for, apart from the installation of the vibration generator, no modifications need be made to the existing ash discharger, so that the existing ash discharger can be retrofitted in a particularly simple manner.

BRIEF DESCRIPTION OF THE DRAWINGS

It has been shown to be advantageous if the vibration generator, particularly an unbalance-type generator, is installed on the bottom of the discharge chute.

The best results with respect to extracting the water have been achieved in that the vibrating generator, in particular an unbalance-type generator, is installed at the border between that section of the discharge chute that is filled with water and the section of the discharge chute that contains no water, and is connected to this.

The present invention will be described in greater detail below on the basis of an embodiment shown in the drawings appended hereto. These drawings, which consist of a single figure, show a partial longitudinal section through a deslagger.

DETAILED DESCRIPTION OF THE INVENTION

The ash that originates in a fire grate (not shown herein) falls into the ash drop shaft 2 of a ash discharger 1. The ash drop shaft opens out into a curved pan 3, on the bottom 4 of which a discharge ram 5 can move back and forth. During each stroke, the discharge ram 5 moves the ash that is resting on the bottom 4 into the discharge chute 6, from which the ash finally moves into the open.

At its rear end, the discharge ram 5 is articulated onto one or a plurality of cranks 7 that are rigidly attached to a shaft 8 which, in its turn, is connected to a drive system (not shown herein).

The discharge ram 5 incorporates a face surface 9 that is essentially perpendicular to the bottom surface 4 of the base pan 3 and serves to expel the ash. In the embodiment shown, the discharge ram 5 incorporates a step 10 that exerts an additional discharge effect.

The front upper area of the discharge chute 6 is defined by a rounded edge 11 that extends into the water bath that is located in the curved pan 3 in order to ensure an air-tight fit of the ash drop shaft, because there is a negative pressure in the furnace fire box. The water level is numbered 12.

The ash that is quenched in the water bath within the curved pan is pushed into the discharge chute 6 that rises obliquely by the face surface 9 of the ram and by the additional step 10, where it emerges from the surface of the water as a compact mass. At this point, water that is adhering to the outside of the ash can flow back into the water bath.

In order to achieve a particularly high level of extraction of the water from the ash that emerges from the discharge chute 6, on the bottom of the discharge chute there is a vibration generator in the form of an unbalanced-type generator 13, and this supports a weight 15 on a driven shaft 14; this causes the whole of the discharge chute to vibrate. These vibrations are transferred to the ash and to the water that is adhering to the ash, and this causes the extraction of a large quantity of water from the ash. When this occurs, the water that has been extracted flows back into the water bath installation of a vibration generator, no other modifications need be undertaken and no additional systems have to be installed. In the preferred embodiment that is shown, the vibration generator 13 is rigidly attached at the border, numbered 16, between the water-filled portion 17 and the water-free section 18 of the discharge chute, to the bottom 19 of the discharge chute, so that the vibrations are transferred to the whole of the discharge chute and thus to the ash.

While the foregoing description and drawings represent the preferred embodiments of the present invention, it will be obvious to those skilled in the art that various changes and modifications may be made therein without departing from the true spirit and scope of the present invention.

What is claimed is:

1. An apparatus for extracting water from ash that has been quenched in a water bath of an ash discharger comprising:

a discharge ram for expelling the ash from said water bath;

a discharge chute positioned external to said water bath, said discharging chute for receiving the ash expelled by said discharge ram;

a vibration generator attached to said discharge cute for vibrating said discharge chute, the ash on said discharge chute being compressed by extension of said discharge ram in combination with vibration of said discharge chute and being loosened by the vibration during retraction of the discharge ram.

2. The apparatus of claim 1 wherein said vibration generator is an unbalanced vibration generator.

3. The apparatus of claim 1 wherein said vibration generator is mounted beneath said discharge chute.

4. The apparatus of claim 1 wherein said discharge chute is inclined to return the water removed from the ash to said water bath.

5. A process for removing water from ash quenched in a water bath of an ash discharger comprising the steps of:

pushing the ash out of the water bath onto a push-out chute using a push-out piston;

vibration part of the push-out chute projecting out of the water bath; and, repeating said pushing and vibration steps, the ash on said push-out chute being compressed by extension of the push-out piston in combination with vibration of said part of the push-out chute and being loosened by the vibration during retraction of the push-out piston, water being squeezed from the ash during the extension of the push-out piston and vibrated from the ash during the retraction of the push-out piston.

6. The process of claim 5 further comprising the step of returning the water removed from the ash to said water bath.

* * * * *